(12) United States Patent
Soichez et al.

(10) Patent No.: US 11,935,395 B2
(45) Date of Patent: Mar. 19, 2024

(54) ACTUATOR HOUSING FOR PROVIDING HAPTIC FEEDBACK IN A VEHICLE

(71) Applicants: NOVARES FRANCE, Clamart (FR); ACTRONIKA, Paris (FR)

(72) Inventors: Cyril Soichez, Roquebrune-Cap-Martin (FR); François Bacelos, Nice (FR); Pierre Comot, Paris (FR); Vincent Hayward, Paris (FR)

(73) Assignees: NOVARES FRANCE, Clamart (FR); ACTRONIKA, Paris (FR)

( * ) Notice: Subject to any disclaimer, the term of this patent is extended or adjusted under 35 U.S.C. 154(b) by 62 days.

(21) Appl. No.: 17/622,209

(22) PCT Filed: Jun. 24, 2020

(86) PCT No.: PCT/FR2020/051096
§ 371 (c)(1),
(2) Date: Dec. 22, 2021

(87) PCT Pub. No.: WO2020/260819
PCT Pub. Date: Dec. 30, 2020

(65) Prior Publication Data
US 2022/0415141 A1     Dec. 29, 2022

(30) Foreign Application Priority Data
Jun. 24, 2019  (FR) ...................... 1906787

(51) Int. Cl.
*H04B 3/36*  (2006.01)
*G08B 6/00*  (2006.01)

(52) U.S. Cl.
CPC ..................... *G08B 6/00* (2013.01)

(58) Field of Classification Search
CPC .. B60B 1/045; B60B 1/04; G08B 6/00; B60K 2370/158; B60K 35/00; B06B 1/045; G06F 3/016
See application file for complete search history.

(56) References Cited

U.S. PATENT DOCUMENTS 10,795,485 B2 * 10/2020 Ehrenberg .............. G06F 3/016
2017/0120297 A1   5/2017 Chun
(Continued)

FOREIGN PATENT DOCUMENTS

| | | |
|---|---|---|
| DE | 102015008573 A1 | 1/2017 |
| EP | 2180396 A1 | 4/2010 |

(Continued)

OTHER PUBLICATIONS

International Search Report dated Sep. 29, 2020 re: Application No. PCT/FR2020/051096, pp. 1-2, citing: EP 2180396 A1, DE 102015008573 A1, WO 2019008021 A1 and US 20170120297 A1.

*Primary Examiner* — Toan N Pham
(74) *Attorney, Agent, or Firm* — CANTOR COLBURN LLP

(57) ABSTRACT

An actuator housing intended to provide haptic feedback in a vehicle includes a container having a recess configured to accommodate an oscillating actuator and an insertion opening that opens into the recess, and a cover configured to at least partially close the insertion opening of the container. The container and the cover are mounted so as to be able to move in translation relative to each other and configured such that, when the oscillating actuator is accommodated in the recess, the oscillation of the oscillating actuator causes the cover to move in translation relative to the container, generating haptic vibration in a direction of movement.

14 Claims, 4 Drawing Sheets

(56) References Cited

U.S. PATENT DOCUMENTS

| | | | | |
|---|---|---|---|---|
| 2019/0033973 A1* | 1/2019 | Vogt | ......................... | G06F 3/016 |
| 2023/0067284 A1* | 3/2023 | Takahashi | .............. | H02K 33/06 |
| 2023/0090674 A1* | 3/2023 | Lee | ......................... | G06F 3/016 |
| | | | | 340/407.1 |
| 2023/0100549 A1* | 3/2023 | Kubo | ..................... | H02K 33/16 |
| | | | | 310/81 |

FOREIGN PATENT DOCUMENTS

| | | | | |
|---|---|---|---|---|
| WO | WO-2018162704 A1 * | 9/2018 | ............. | B60K 35/00 |
| WO | 2019008021 A1 | 1/2019 | | |

* cited by examiner

[Fig. 1]
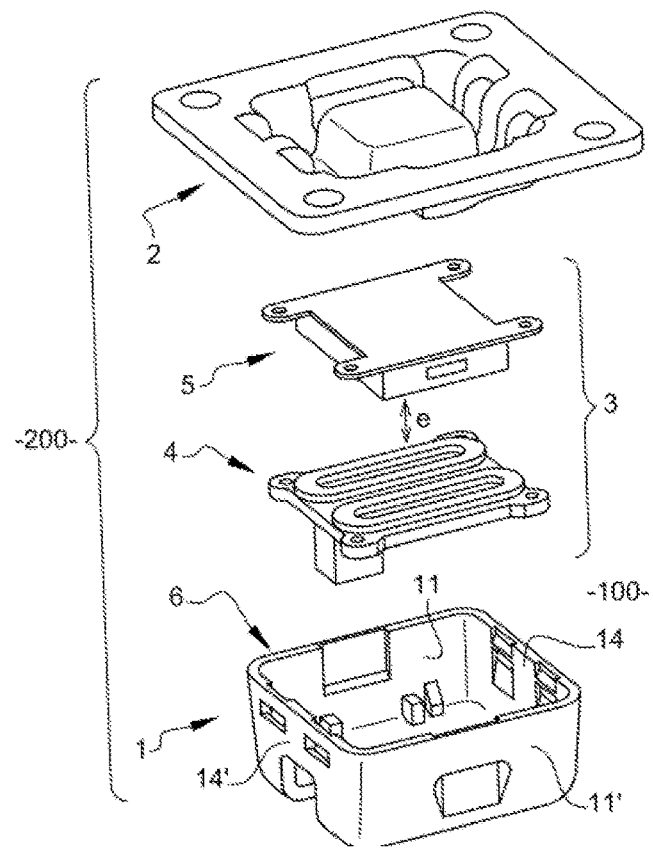
[Fig. 2]
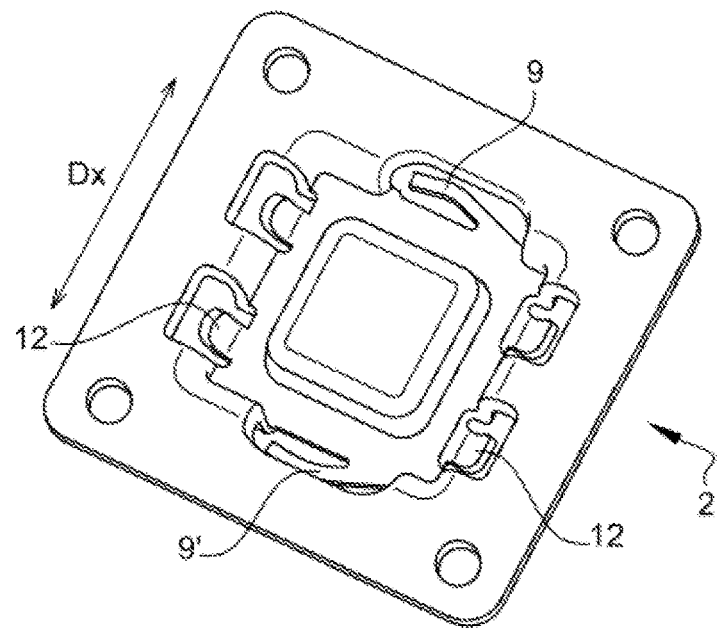

[Fig. 3]
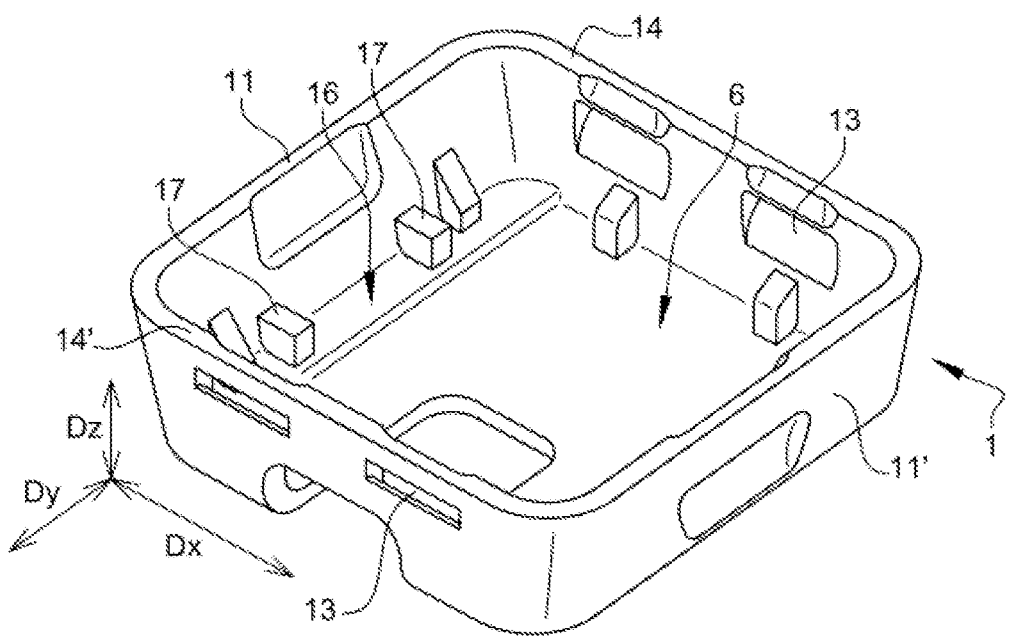
[Fig. 4]
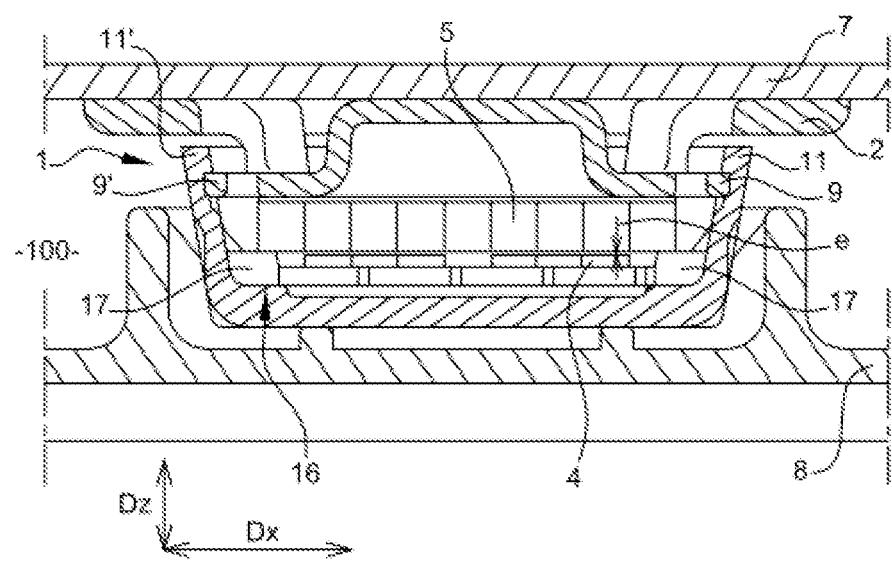

[Fig. 5]
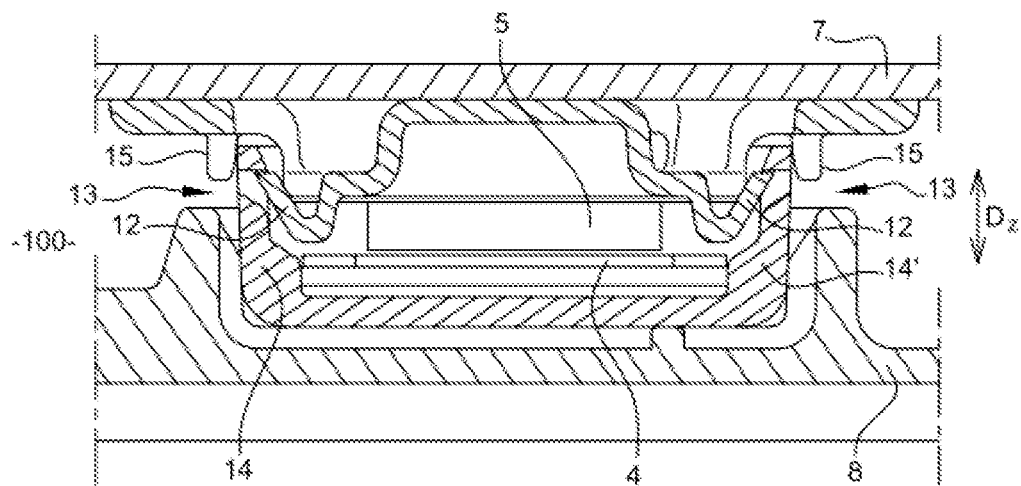
[Fig. 6]
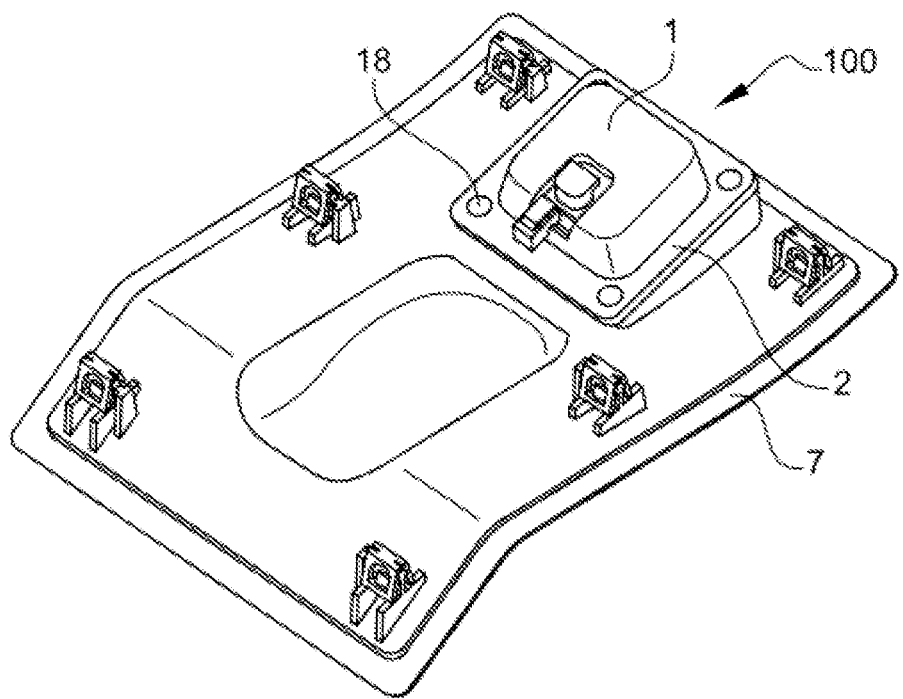

[Fig. 7]
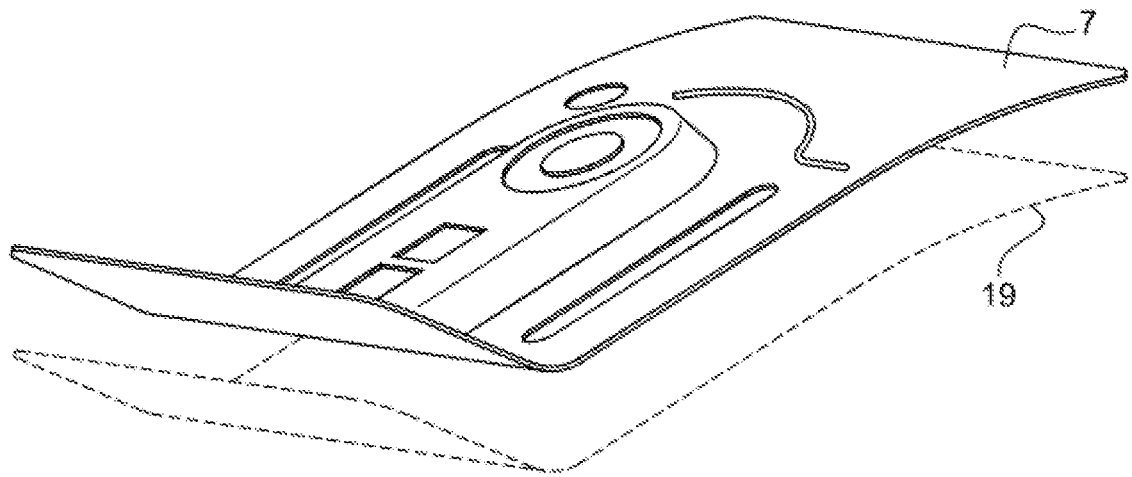
[Fig. 8]
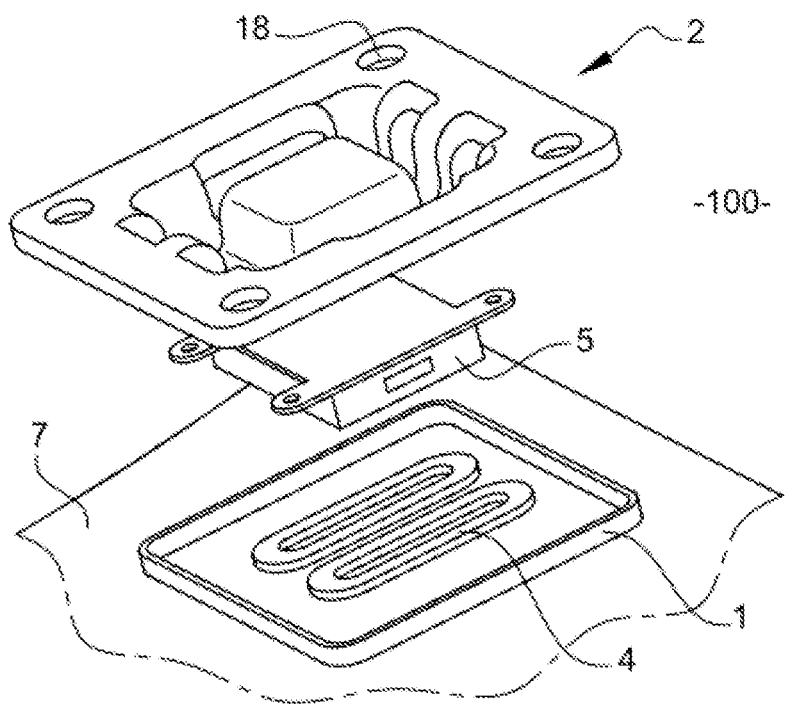

ACTUATOR HOUSING FOR PROVIDING HAPTIC FEEDBACK IN A VEHICLE

TECHNICAL FIELD

The present disclosure relates to the field of haptic feedback in a vehicle passenger compartment, such as for example a motor vehicle. It concerns in particular an actuation casing and an actuator module for haptic feedback.

BACKGROUND

Current vehicles have more and more haptic feedback functions accessible to the driver and passengers from different locations in the passenger compartment. Nonetheless, the haptic modules integrated into the passenger compartment are all designed and shaped to date for an integration dedicated to each of the different concerned trim parts. As a result, the actuators have various sizes and powers to be adapted to the dimensions, surfaces and weight of the parts which must provide haptic feedback to the user in a same vehicle. The dimensions and shaping of the elements making it possible to transform the oscillatory movement of haptic vibration actuators are thus all dedicated to the actuators and therefore to the trim parts.

SUMMARY

One of the aims of the disclosure is to overcome at least one of these disadvantages. To this end, the present disclosure provides an actuation casing intended to provide haptic feedback in a vehicle, the actuation casing including:
- a container comprising a housing configured to house an oscillating actuator and an insertion opening emerging into the housing,
- a cover configured to at least partially close the insertion opening of the container, the container and the cover being movably mounted in translation with respect to one another and configured such that, when the oscillation actuator is housed in the housing, an oscillation of said oscillation actuator generates a relative translational movement of the cover vis-à-vis the container, generating a haptic vibration in a displacement direction Dx.

Thus, the present disclosure proposes an actuation casing making it possible to house an oscillating actuator and to provide haptic feedback which is not dedicated to the trim part to which it will be integrated. This allows a standardization of elements with haptic vibration, allowing easy integration into the passenger compartment. Indeed, the haptic vibrations being generated by the casing, it suffices to attach it to a trim part so that the latter is able to provide said haptic feedback. Depending on the surface or the weight of the trim part, several actuation casings can be fixed regularly on the inner surface of the part so as to provide a uniform desired haptic feedback over the entire part. This allows mass production of a single casing at lower cost. This also makes it possible to limit the adjustment of the parameters of the actuator by comparison with the integration method generally used which requires the adjustment of the parameters for each of the dedicated actuators arranged in the passenger compartment.

The expression «displacement direction Dx» means, in the document, a displacement in the two possible directions along the direction Dx.

Preferably, when the oscillating actuator is housed in the housing, an oscillation of said oscillating actuator generates a relative translational movement of the cover vis-à-vis the container, generating a haptic vibration according to a single displacement direction Dx, in the two possible directions following the direction Dx.

Advantageously, the housing is dedicated to a single oscillating actuator. In other words, the housing is configured to only house an actuator. It does not have the possibility or the space to house or receive other functions that may be provided in the actuation casing.

According to one arrangement, the cover comprises a first elastic member configured to bear against a first lateral wall of the container and a second elastic member configured to bear against a second lateral wall of the container arranged on the side opposite to the first lateral wall, to allow the relative translational movement of the cover vis-à-vis the container following the displacement direction Dx. Thus, these elastic members make it possible to transform the oscillating movements of the actuator into haptic vibrations.

According to one possibility, the first lateral wall and the second lateral wall at least partially delimit the housing provided in the container.

According to one embodiment, each of the first elastic member and of the second elastic member comprises an elastically deformable tab in the displacement direction Dx.

According to an alternative, the container comprises elastic means, such as elastically deformable tabs in the displacement direction Dx, configured to allow the relative translational movement of the cover with respect to the container following the displacement direction Dx.

According to a particular arrangement, the cover comprises a first fixing means configured to cooperate with a second complementary fixing means provided on the container, the first fixing means and the second complementary fixing means being configured to hold the cover on the container in a perpendicular direction Dz along the height of the housing, perpendicular to an extension plane of the cover and so as to allow the relative translational movement of the cover with respect to the container in the displacement direction Dx. This advantageously makes it possible to prevent the supply of haptic vibrations in the perpendicular direction Dz. This also limits the size of the actuation casing.

According to one possibility, the first fixing means comprises fixing legs and the second complementary fixing means comprises through openings made in a third lateral wall and a fourth lateral wall of the container opposite the third lateral wall, the fixing legs and the through openings being configured to allow clipping between the cover and the container and to hold the cover on the container in the perpendicular direction Dz.

Advantageously, the fixing legs include a transverse dimension smaller than the transverse dimension of the through openings. Thus, means that are simple to implement guarantee said relative translational movement of the cover with respect to the container in the displacement direction Dx.

According to one possibility, the cover comprises clearance zones on either side of the legs so as to limit the friction during the relative translational movement of the cover.

Advantageously, the cover comprises guide elements configured to cooperate with the outer faces of a third lateral wall and of a fourth lateral wall of the container extending in a transverse direction Dy extending substantially in a plane of extension of the cover and perpendicular to the displacement direction Dx, so as to ensure a guidance of the relative translational movement of the cover with respect to the container in the displacement direction Dx.

Due to the special cooperation of the cover on the container, the haptic vibration is contained mainly in one direction, regardless of the type of used oscillating actuator. It is thus possible to use a multidirectional actuator while having a haptic feedback in an optimal direction, in relation to the displacement direction Dx (in both ways of the direction Dx)

According to one possibility, the third lateral wall and the fourth lateral wall of the container are perpendicular to the first and second lateral walls of the container.

Advantageously, the housing comprises a first bearing zone and a second bearing zone offset in a perpendicular direction Dz extending along the height of the housing and substantially perpendicular to an extension plane of the cover, the first bearing zone and the second bearing zone being configured to receive as a bearing respectively a movable part and a fixed part of an actuator oscillating in an offset manner in the perpendicular direction Dz, so as to form an air-gap of a predetermined thickness between the fixed part and the movable part. This configuration makes it possible to guarantee the presence of an air-gap of a determined dimension, in particular useful for an oscillating actuator comprising a pair formed of coils and magnets or of electromagnets, the coils and magnets being able to be fixed either on the cover or on the container. This configuration making it possible to obtain an air-gap of a fixed dimension, the actuator parameters, and the choice of current intensity are set only once for all actuator casings thus standardized.

Advantageously, the dimensions of the container and of the cover of the actuation casing and the positioning of the first bearing zone and of the second bearing zone are configured according to the thickness of the movable part and of the fixed part of the oscillating actuator so as to generate an interstitial space delimiting an air-gap having a thickness preferably less than about 0.5 mm+/−0.1 mm.

According to one arrangement, the container comprises a housing configured to house a single oscillating actuator. The formation of an air-gap of a predetermined thickness between the fixed part and the movable part of the single actuator is thus easier to obtain.

Advantageously, the cover and/or the container comprises first fixing elements configured to fix the actuation casing to a body of the vehicle and second fixing elements configured to fix the actuation casing to a trim part of the vehicle passenger compartment.

Thus, the oscillating actuator which generates a relative translational movement of the cover with respect to the container of the haptic vibration type, also generates a relative translational movement of the trim part with respect to the body in the displacement direction Dx providing haptic feedback to a user.

According to one possibility, the container and the cover each comprise a part made of molded plastic material. Thus, the actuation casing can be produced on a large scale while maintaining the same air-gap for each of the actuators. The magnetic field and the oscillating feedback being directly linked to the thickness of the air-gap, once the optimum setting of the parameters has been found, it is reproduced in the same way for each of the actuation casings in a vehicle. This provides an improved ease of use with respect to other situations in which the vehicle comprises different actuation casings, each dedicated to an actuator which is itself dimensioned according to the trim part.

According to another aspect, the present disclosure provides a haptic feedback actuator module intended for integration into a vehicle passenger compartment, the haptic feedback actuator module comprising:

an actuation casing as described above
an oscillating actuator housed in the housing, so as to generate a haptic vibration in a displacement direction Dx.

According to one possibility, the actuator module comprises a trim part of the vehicle passenger compartment, and one of the container or the cover of the actuation casing forms an integral part of the trim part, the other of the container or the cover is intended to be fixed to a support of a vehicle body.

This configuration makes it possible to improve the compactness of the actuator module, the container or the cover retaining its standard character.

According to one possibility, the oscillating actuator includes:
a movable part such as an array of magnets attached to the cover, and
a fixed part such as an array of coils, for example, fixed or printed on the container, the container forming an integral part of the rear face of the trim part and the cover being intended to be fixed to the support of the vehicle body.

According to another possibility, the oscillating actuator is an actuator with a rotary motor, the movable part of which is fixed to the cover.

According to an alternative embodiment, the container forms an integral part of the rear face of the trim part and the cover is intended to be fixed to the support of the vehicle body.

According to another possibility, the actuator module comprises a contact sensor configured to detect a finger of a user on the front face of the trim part. The contact sensor communicates to a control unit the detection of the contact of a finger of a user which supplies a power supply in return to the oscillating actuator for the emission of a haptic feedback by the trim part.

The actuator module advantageously comprises the control unit configured to communicate with the contact sensor and the oscillating actuator.

BRIEF DESCRIPTION OF THE DRAWINGS

Other aspects, aims and advantages of the present disclosure will emerge more clearly on reading the following description of an embodiment thereof, given by way of non-limiting example and made with reference to the accompanying drawings. The figures do not necessarily respect the scale of all the elements represented so as to improve their readability and on which we can see:

FIG. 1 an exploded view of the actuation casing according to an embodiment of the disclosure, FIG. 2 a schematic view of the cover of the actuation casing according to the embodiment illustrated in FIG. 1, FIG. 3 a schematic view of the container of the actuation casing according to the embodiment illustrated in FIG. 1, FIG. 4 a cross-sectional view of the actuation casing integrated into a trim part of a vehicle passenger compartment according to the embodiment of the disclosure illustrated in FIG. 1, FIG. 5 a cross-sectional view of the actuation casing integrated into a trim part of a vehicle passenger compartment according to the embodiment of the disclosure illustrated in FIG. 1, FIG. 6 a view of the actuation casing fixed to a rear face of a trim part of a vehicle passenger compartment according to one embodiment of the disclosure, FIG. 7 a view of a front face of a trim part of a vehicle passenger compartment, and FIG. 8 a view of the actuator module according to one embodiment of the disclosure.

DETAILED DESCRIPTION OF THE DRAWINGS

As illustrated in FIG. 1, the actuation casing 100 according to the present disclosure comprises a container 1 delimiting a housing 6 ending in an insertion opening, a cover 2 configured to close at least partially the insertion opening and an oscillating actuator housed in the housing. The cover 2 and the container 1 are movably mounted in translation with respect to one another in a displacement direction Dx.

In the embodiment illustrated in FIG. 1, the oscillating actuator 3 is an actuator 3 of the vibrating type composed of a fixed part 4, here an array of coils fixed in the housing 6, and of a movable part 5, here an array of magnets fixed on the inner face of the cover 2, facing the housing 6. The cover 2 and the container 1 are fixed to each other so as to allow a translational movement relative of the cover 2 vis-à-vis the container. Thus, during the operation of the actuator 3, the array of coils 4 is supplied with electric current and generates a magnetic field which results in a translational movement of the array of magnets 5. The array of magnets 5 being fixed to the cover 2, the latter is animated by a relative translational movement with respect to the container 1 generating a haptic vibration. This haptic vibration is transmitted directly to a trim part 7 of the passenger compartment, fixed to the casing 100. According to the embodiment illustrated in FIG. 4, the cover 2 is fixed to the trim part 7 of the passenger compartment and the container 1 is fixed to a support of the vehicle body 8. Thus, the haptic vibrations are transmitted to the user via the trim part 7 of the passenger compartment.

As visible in FIGS. 2 and 4, the cover 2 comprises a first elastic member 9 configured to bear against a first lateral wall 11 of the container 1 and a second elastic member 9' configured to bear against a second lateral wall 11' of the container 1 disposed on the side opposite to the first lateral wall 11. In the embodiment illustrated in the figures, these elastic members comprise tabs elastically deformable in the displacement direction Dx and allow the relative translational movement of the cover 2 vis-à-vis the container 1. According to a non-illustrated variant, the cover comprises elastic means such as elastically deformable tabs in the direction Dx so as to allow the relative translational movement.

Also visible in FIGS. 3 and 5, the cover 2 comprises a first fixing means configured to cooperate with a second complementary fixing means provided on the container 1, such as respectively fixing tabs 12 and corresponding through openings 13, making it possible to hold the cover 2 on the container 1 in a perpendicular direction Dz extending along the height of the housing 6 and substantially perpendicular to an extension plane of the cover 2, while allowing the relative translational movement of the cover 2 with respect to the container 1 in the displacement direction Dx. The through openings 13 are formed in a third lateral wall of the container 1 and in a fourth lateral wall opposite to the third lateral wall 14 extending in a transverse direction Dy extending in an extension plane of the cover 2, substantially perpendicular to the displacement direction Dx. The fixing legs 12 are arranged on the cover 2 so that they can be clipped into the corresponding through openings 13. In order to be able to allow the translational movement in the displacement direction Dx, the fixing legs 12 of the cover 2 include a transverse dimension smaller than the transverse dimension of the through openings 13 of the container 1.

As illustrated in FIG. 5, the cover 2 comprises guide elements 15, such as studs, configured to cooperate with the outer faces of the third lateral wall 14 and of the fourth lateral wall 14' of the container 1, so as to ensure a guidance of the relative translational movement of the cover 2 with respect to the container 1 in the displacement direction Dx. These guide elements 15 thus make it possible to prohibit a relative movement of the cover 2 with respect to the container 1 in a transverse direction Dy perpendicular to the displacement direction Dx so that the actuation casing 100 constrains the oscillating movement of an oscillating actuator 3 in a single displacement direction Dx.

Illustrated in FIGS. 1 and 3, the housing 6 of the container 1 has a generally rectangle longitudinal section. The first and second lateral walls 11, 11' and the third and fourth lateral walls 14, 14' delimiting the housing 6 are parallel two by two. Thus, the guide elements 15, the orientation of the lateral walls 11, 14, the fixing legs 12 and the transverse openings 13 ensure a sliding in the displacement direction Dx of the cover 2 with respect to the container 1.

Also illustrated in FIGS. 3 to 5, the housing 6 comprises a first bearing zone 16 intended for the bearing of the array of coils 4 of the actuator 3. The housing 6 also comprises a second bearing zone 17 offset from the first bearing zone 16 in the perpendicular direction Dz and configured to receive as a bearing the movable part 5 of the actuator 3. This configuration makes it possible to create an air-gap e of a determined and fixed thickness between the array of coils 4 and the array of magnets 5. The thickness of the air-gap e being fixed, the haptic vibration generated in the actuation casing 100 is standardized and the calibration for a desired haptic feedback is facilitated. According to a non-illustrated embodiment, the array of coils 4 is fixed on the cover 2 and the array of magnets 5 is fixed on the container 1 and the relative translational movement of the cover 2 vis-à-vis the container 1 in the displacement direction Dx remains unchanged.

According to another non-illustrated embodiment, the oscillating actuator 3 is selected from actuators 3 generating oscillations in multiple directions, linear motor actuators with a halbach array (described for example in document WO2019/008021) or rotary motor actuators 3, leaf actuators 3, or actuators 3 of the coil and electromagnet type.

In fact, the relative translational movement of the container 1 and of the cover 2 is limited in the perpendicular direction Dz perpendicular to the extension plane of the cover 2. This makes it possible to restrict a multidirectional oscillating actuator 3 in a movement in a plane by preventing a movement of the cover 2 or of the container 1 in the perpendicular direction Dz. Moreover, the guide elements 15 also prevent a relative movement of the cover 2 vis-à-vis the container 1 in a transverse direction Dy perpendicular to the displacement direction Dx. Thus, the actuation casing 100 according to the disclosure constrains the oscillating movement of an oscillating actuator 3 in a displacement direction Dx allowing optimal haptic feedback.

In the case of actuators 3 with rotary motors (not illustrated), the fixed part 4 comprising the motor is fixed in the housing 6 and the movable part 5 constituted by the arm of the motor is fixed to the cover 2 and generates the haptic vibrations.

When actuators 3 with blades are used (not illustrated), the membrane comprising the blades is fixed to the cover 2. The membrane, depending on the application of an electric current, is subjected to forces resulting in compression or expansion generating micro-vibrations.

FIGS. 4 to 6 illustrate the first elements for fixing the container 1 to a body 8 of a vehicle obtained by clipping, or an attached stapling or alternatively, according to a non-illustrated possibility, by a fastening obtained by gluing using an adhesive foam.

The second elements 18 for fixing the cover 2 to a trim part of the passenger compartment are clipping elements (visible in FIG. 6—openings in the cover 2 are illustrated in FIG. 2). According to a non-illustrated variant, the fixing is obtained by welding or by snap-fastening. It is understood in this document that the haptic feedback is guaranteed thanks to the intrinsic play existing in the fixing itself of the trim part 7 to the vehicle passenger compartment.

FIG. 8 represents an actuator module 200 according to the second aspect of the disclosure. As illustrated, the actuator module 200 comprises a trim part 7 of the passenger compartment, a contact sensor 19 (not visible) and an actuation casing 100 as described above and of which the container 1 has the particularity of forming an integral part of the trim part 7. This makes it possible to gain in compactness, in lightness and also to facilitate the integration of an actuator 3 with haptic feedback in the passenger compartment. The cover 2 of the actuation casing 100 is movably mounted in translation on the walls of the housing 6 of the container 1 allowing a relative translational movement in the displacement direction Dx with respect to the trim part 7. The cover 2 is moreover fixed to a support of the vehicle body 8. Thus immobilized, it is the container 1 or the trim part 7 which will be driven by a relative translational movement, generating a haptic feedback. An array of coils 4 is printed in the housing 6 on the rear face of the trim part 7, and the array of magnets 5 is fixed to the cover 2. The contact sensor 19 is a capacitive film placed on the rear face of the trim part 7, as illustrated in FIG. 7 on which is printed the array of coils 4. According to a non-illustrated alternative, the contact sensor 19 is a pressure sensor using a strain gauge. According to another non-illustrated variant, the array of coils 4 is fixed to the rear face of the trim part.

According to another non-illustrated variant, the cover 2 of the actuation casing 100 forms an integral part of the trim part 7. The container 1 is fixed to a support of the vehicle body 8. The relative movably mounting in translation along the displacement direction Dx of the container 1 and of the cover 2 allows haptic feedback via the trim part 7.

Thus the present disclosure provides an inexpensive actuation casing 100, which can be integrated into all vehicles regardless of their categories. A move upmarket including haptic feedback is facilitated because the size is the same whether the casing is empty or completed with an actuator 3. In addition, the casing being standard, the resulting haptic vibrations exhibit the same haptic response characteristics so that the time required for calibration operations is reduced and that a quality of haptic response specific to a range of vehicle is easily configurable only by a software controlling the actuator. It is also easy to vary the sensitivity of the haptic feedback obtained according to the different ranges of vehicles equipped with this casing.

The actuator module 200 in which the cover 2 or the container 1 forms an integral part of the trim part 7 is even more compact and lightweight.

It goes without saying that the disclosure is not limited to the embodiment described above by way of example but that it comprises all the technical equivalents and the variants of the means described as well as their combinations.

The invention claimed is:

1. An actuation casing for providing haptic feedback in a vehicle, the actuation casing including:
   a container comprising a housing configured to house an oscillating actuator and an insertion opening emerging into the housing, and
   a cover configured to at least partially close the insertion opening of the container, the container and the cover being movably mounted in translation relative to each other and configured such that, when the oscillating actuator is housed in the housing, an oscillation of said oscillating actuator generates a relative translational movement of the cover with respect to the container, generating a haptic vibration in a displacement direction,
   wherein the housing comprises a first bearing zone and a second bearing zone offset in a perpendicular direction extending along the height of the housing and substantially perpendicular to an extension plane of the cover, the first bearing zone and the second bearing zone being configured to respectively support a movable part and a fixed part of an actuator oscillating in a manner offset in the perpendicular direction (Dz), so as to form an air-gap of a predetermined thickness between the fixed part and the movable part.

2. The actuation casing according to claim 1, wherein the cover comprises a first elastic member configured to bear against a first lateral wall of the container and a second elastic member configured to bear against a second lateral wall of the container arranged on the side opposite to the first lateral wall, to allow the relative translational movement of the cover with respect to the container in the displacement direction.

3. The actuation casing according to claim 2, wherein each of the first elastic member and of the second elastic member comprises a tab elastically deformable in the displacement direction.

4. The actuation casing according to claim 1, wherein the container comprises elastic means configured to authorize the relative translational movement of the cover with respect to the container in the displacement direction.

5. The actuation casing according to claim 4, wherein the elastic means comprise a tab elastically deformable in the displacement direction.

6. The actuation casing according to claim 1 wherein the cover comprises a first fixing means configured to cooperate with a second fixing means provided on the container, the first fixing means and the second fixing means being configured to hold the cover on the container in a perpendicular direction along the height of the housing, perpendicular to a plane of extension of the cover and so as to allow the relative translational movement of the cover with respect to the container in the displacement direction.

7. The actuation casing according to claim 6, wherein the first fixing means comprises fixing legs and the second complementary fixing means comprises through openings formed in a third lateral wall and a fourth lateral wall of the container opposite the third lateral wall, the fixing tabs and the through openings being configured to allow clipping between the cover and the container and to hold the cover on the container in the perpendicular direction.

8. The actuation casing according to claim 1, wherein the cover comprises guide elements configured to cooperate with the outer faces of a third lateral wall and a fourth lateral wall of the container extending in a transverse direction extending in an extension plane of the cover and perpendicular to the displacement direction, so as to ensure guiding the relative translational movement of the cover with respect to the container in the displacement direction.

9. The actuation casing according to claim 1, wherein the cover and/or the container comprises first fixing elements configured to fix the actuation casing to a body of the vehicle and second fixing elements configured to fix the actuation casing to a trim part of the vehicle passenger compartment.

10. An actuator module with haptic feedback intended for an integration into a vehicle passenger compartment, the actuator module with haptic feedback comprising:
the actuation casing according to claim 1, and
an oscillating actuator housed in the housing, so as to generate a haptic vibration in a displacement direction.

11. The actuator module with haptic feedback according to claim 10 further comprising a trim part of the vehicle passenger compartment, and one of the container or the cover of the actuation casing forms an integral part of the trim part, the other of the container or of the cover is intended to be fixed to a support of a body of the vehicle.

12. The actuator module with haptic feedback according to claim 11, wherein the oscillating actuator includes:
a movable part, and
a fixed part, the container forming an integral part of the rear face of the trim part and the cover being intended to be fixed to the support of the body of the vehicle.

13. The actuator module with haptic feedback according to claim 12, wherein the movable part comprises an array of magnets fixed to the cover, and
the fixed part comprises an array of coils printed on the container.

14. The actuator module with haptic feedback according to claim 12, wherein the movable part comprises an array of magnets fixed to the cover and the fixed part comprises an array of coils fixed on the container.

* * * * *